Figure 1:
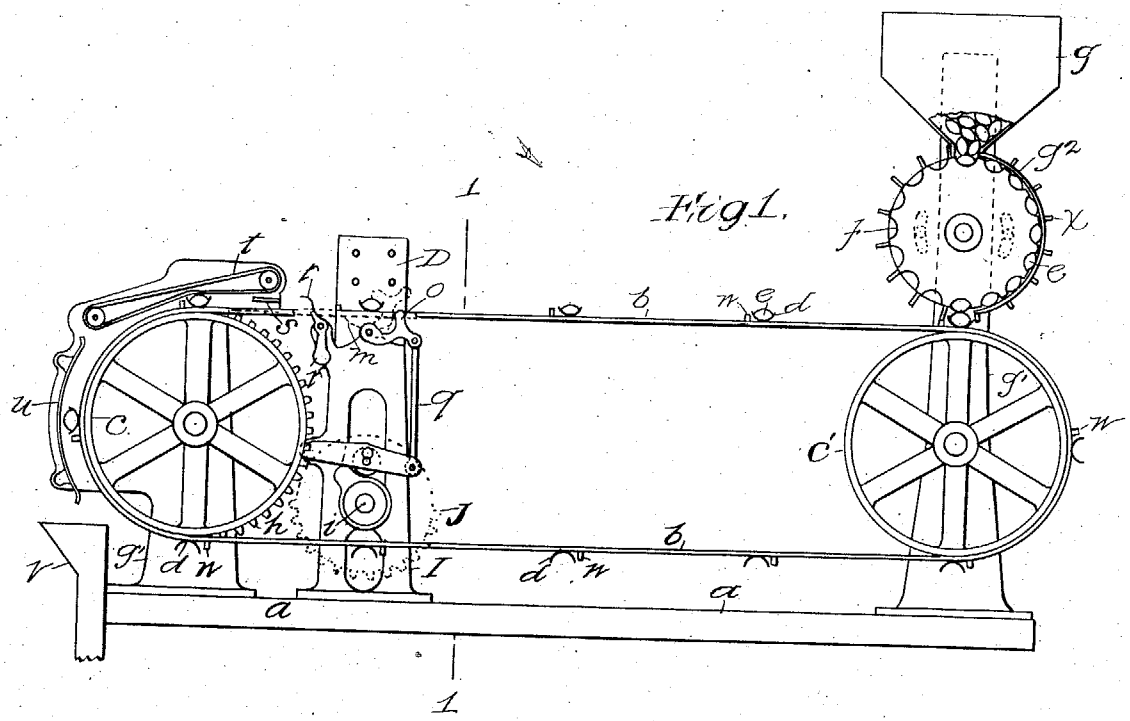

A. BOUCHER.

INDIVIDUAL CIGARETTE TIPPING MACHINE.

APPLICATION FILED FEB. 24, 1910.

Reissued Apr. 19, 1910.

13,105.

3 SHEETS—SHEET 1.

Witnesses:
W. H. Benjamin
Edward D. C. Spurry

Inventor
Alexander Boucher
By his Attorney
Charles G. Hensley

A. BOUCHER.

INDIVIDUAL CIGARETTE TIPPING MACHINE.

APPLICATION FILED FEB. 24, 1910.

Reissued Apr. 19, 1910.

13,105.

3 SHEETS—SHEET 2.

Witnesses:
W. H. Benjamin
Edwin D. C. Spurr

Inventor
Alexander Boucher
By his Attorney
Charles G. Neasley.

A. BOUCHER.
INDIVIDUAL CIGARETTE TIPPING MACHINE.
APPLICATION FILED FEB. 24, 1910.
Reissued Apr. 19, 1910.
13,105.
3 SHEETS—SHEET 3.
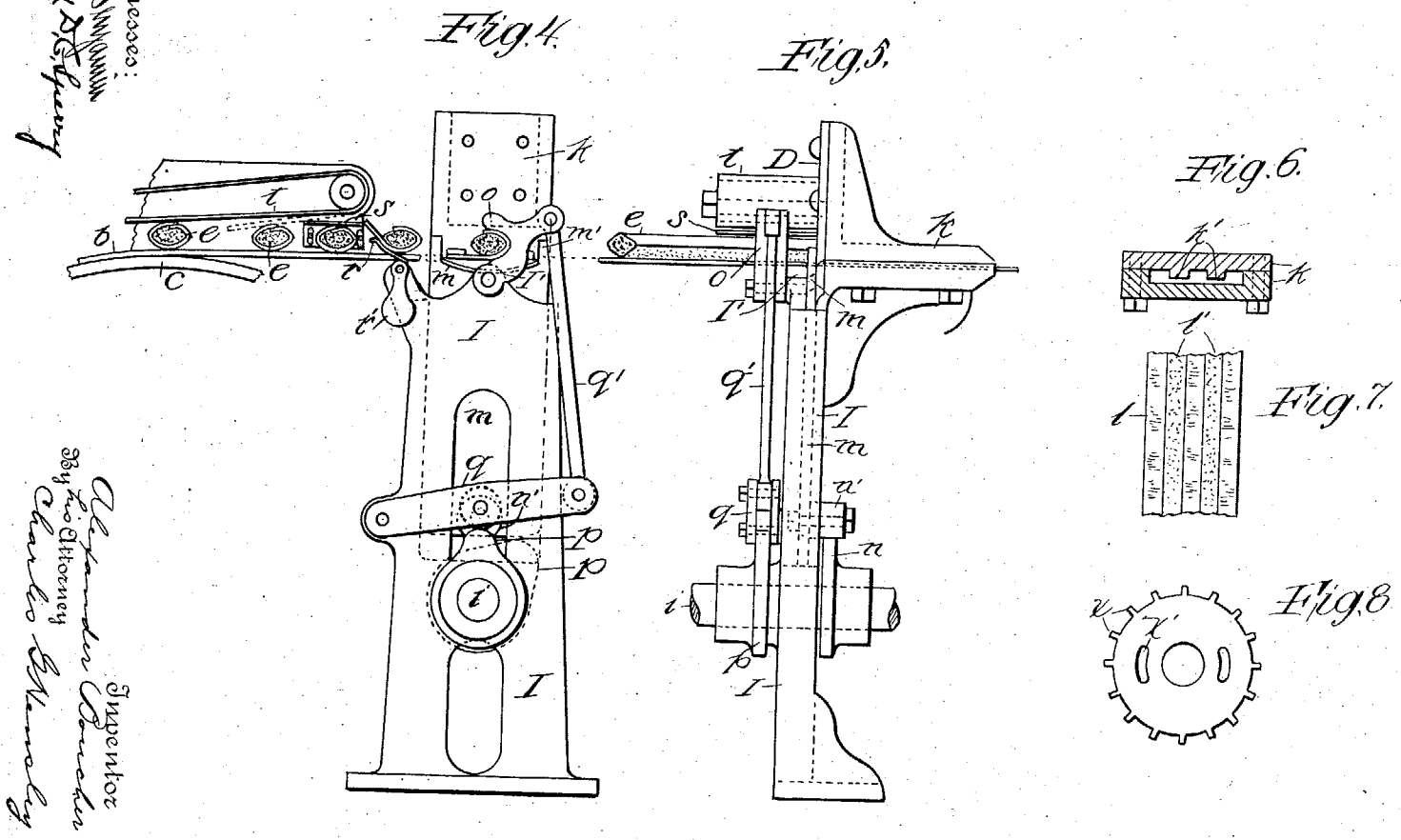
Witnesses:
W. H. Benjamin
Edward D. G. Spencer
Inventor
Alexander Boucher
By his Attorney
Charles G. Neasley

UNITED STATES PATENT OFFICE.

ALEXANDER BOUCHER, OF HINGHAM, MASSACHUSETTS, ASSIGNOR, BY MESNE ASSIGNMENTS, TO ARTHUR L. BOUCHER, OF NEW YORK, N. Y.

INDIVIDUAL-CIGARETTE-TIPPING MACHINE.

13,105. Specification of Reissued Letters Patent. Reissued Apr. 19, 1910.

Original No. 887,761, dated May 19, 1908, Serial No. 343,337. Application for reissue filed February 24, 1910. Serial No. 545,791.

*To all whom it may concern:*

Be it known that I, ALEXANDER BOUCHER, a citizen of the United States, residing in the town of Hingham, in the county of Plymouth and State of Massachusetts, have invented certain new and useful Improvements in Individual-Cigarette-Tipping Machines, of which the following is a specification.

The present invention relates to means for delivering cigarettes successively to a tipping device, feeding the end of a pasted strip of tipping material under the end of the cigarette, severing a portion of the strip to form a tipping piece and wrapping such severed section about the end of the cigarettes as they are presented.

Heretofore it has been customary to feed the tipping material in the form of a strip, from a bobbin, in a direction at right angles to the direction of the cigarette when in its tipping position or to feed the tip sections from a stack of cut sections and then apply the tip about the cigarette end. The tipping material has been fed from below and from the same plane, but always at an angle to the cigarette when in its tipping position. This has resulted in failure to produce even, straight tips on the cigarettes. The tipping material is usually of cork, which generally runs about five thousandths of an inch in thickness and is usually supplied in long strips wound in bobbins, the material being very accurately cut in its width so that as far as the width of the strip is concerned it runs very regular. In applying the tips to cigarettes the work must be very accurate, as the requirements of the trade are very exacting and unless the machine can turn out accurately tipped cigarettes with a small percentage of discards the machine is not apt to displace hand labor. The tipping material must be flush with the end of the cigarette or otherwise the cork tip will either lengthen the whole cigarette, or a white collar will show where the cork fails to come up to the edge of the paper at the end of the cigarette; and the tip must be wrapped about the cigarettes so that the edges of the tip will overlap to form a seam which must be uniform on each cigarette and must be uniform in the whole output; furthermore the tip must not be spirally disposed on the cigarette. Any or all such defects causes the cigarettes to become discarded and in prior machines these discards have been numerous. It is my purpose to feed the cork longitudinally of the cigarette as the latter is positioned for tipping and to preferably feed the cork under the cigarette before severing the piece which is to form the tip for the cigarette. By this method of feeding I am able to tip the cigarettes more regularly. The size of the cigarettes being a determined factor and the width of the cork strip being uniform throughout the tips will have a uniform overlapping seam when applied. Furthermore I am better able to position the cork ready to be applied to the cigarette, so that the cork may be placed flush with the cigarette end, and so that the tip will be applied straight around the cigarette instead of twisting spirally. The uniformity of the overlapping of the tip edges is not only desirable for good appearances but irregularity in the width of the tip is apt to interfere with most tip applying devices in the proper application of the tip. The present device entirely improves the product and the feeding of the cork is a decided advantage over former feeding arrangements.

In practice I feed the cigarettes from a magazine successively to holders upon a belt which is moved intermittently to carry the cigarettes successively to the tipping device where the pasted section is partially wrapped thereon, and the wrapping is completed by a renewed movement of the belt carrying the cigarette past a yielding finger and an apron which complete the wrapping of the section.

Figure 2:
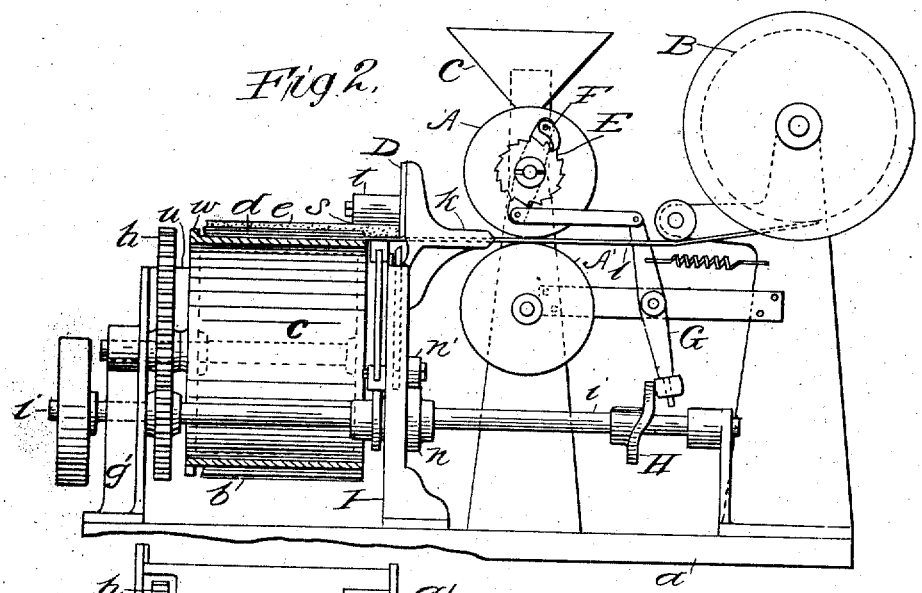
Figure 3:
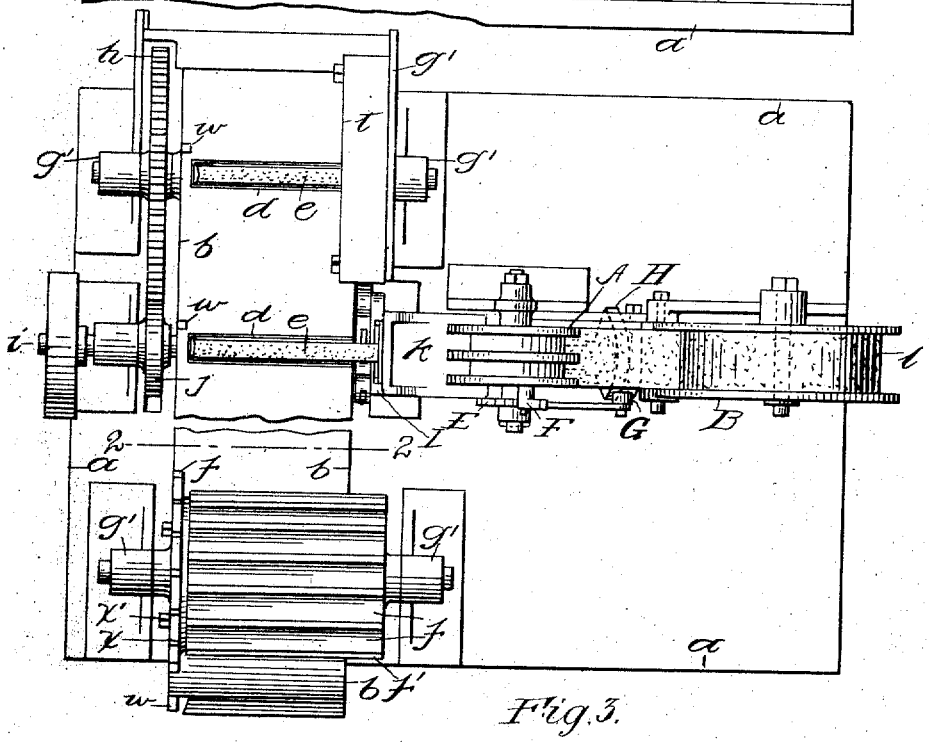

The invention will be understood by reference to the annexed drawings, in which, Figure 1 is a side elevation of the machine with a part of the magazine broken away, the nearer standards $g'$ and the gearing removed, and the parts $h$, $j$, $x$, and $x'$ indicated diagrammatically, to show their relations to the other parts. Fig. 2 is an end elevation of the machine with the parts omitted which are shown below the line 2, 2, in Fig. 3; and Fig. 3 is a plan of the machine with the cigarette carrier belt broken for want of room on the drawing. Fig. 4 is a side view of the standard I with the upper cutter removed but showing the folding agencies; Fig. 5 is an edge view of the standard, and Fig. 6 is a section of the tipping strip guide. Fig. 7 shows a piece of pasted strip; and Fig. 8 the disk *y*.

*a* is the bed carrying the working parts, *b* is the carrier-belt mounted upon a driving wheel *c*, and idle pulley *c'* and provided with cigarette holders *d*.

The holders are supplied successively with cigarettes *e*, from grooves *f* in a feeding drum *f'* which receive the cigarettes from a hopper *g*. The idle pulley *c'* and the drum *f'* are journaled upon standards or bearings *g'* which also support the hopper *g*, and a half casing $g^2$ is extended from the hopper around the delivery side of the grooved drum to hold the cigarettes in the grooves until they reach the lowest point, where the termination of the casing permits them to drop. One edge of the belt has a tooth or dog *w*, adjacent to each holder, which dog acts upon studs *x* upon the grooved drum, and turns the drum the width of one groove when a holder is moved to the open end of the casing $g^2$. Such intermittent turning of the drum discharges the cigarettes into the holders.

The axle of the drive wheel *c* is provided with a gear wheel *h*, and an adjacent driving shaft *i*, termed the "cam shaft" herein, is provided with a segmental or mutilated gear wheel *j*, which is rotated continuously and operates to turn the driving wheel intermittently, and thus move the belt to carry the cigarettes in their holders from the drum *f'* to the tipping device. The cigarette holders are thus stationary for a part of the time, and opposite one of their stations a guide *k* is supported upon a standard I to receive the strip *l* of tipping material from a paste roll A which, in conjunction with a presser roll A' draws the strip from a reel or bobbin B.

The cigarettes project over the edge of the belt *b* sufficiently to apply the tipping material to their ends, and an upper cutter D is mounted adjacent to the path of such ends at the station where the tipping section is applied, the cutter being supported upon the same standard by the strip guide *k*. The edge of such cutter stands at the bottom edge of the cigarette, and the end of the strip of tipping material is fed beneath the cutter and the lower side of the cigarette when the cigarette reaches such station.

The paste roll A is formed with three disks to lay central and lateral strips of paste upon the tipping strip so as to leave spaces *l'* upon the upper surface of the strip, which move through the guide *k* in contact with tongues *k'*, and the pasted surface of the strip is thus prevented from contact with the guide. See Figs. 6 and 7.

As the strips of paste lie along the edges and middle of the strip, they provide each section with a strip of paste along its edges, which secures one of the edges to the cigarette wrapper, and secures the other edge with a lap-joint upon the first one, when the section is folded upon the cigarette. The paste roll is turned by a ratchet wheel E and a pawl F carried by an arm upon the axle of the paste roll A, and oscillated through a lever G by a cam H upon the cam shaft.

The standard I forms a cutter guide which is slotted vertically, and has a movable cutter M, fitted therein to move against the face of the cutter D. The cam shaft *i*, passes through the standard or cutter guide I, as shown in Fig. 1, and has adjacent to one side of the standard a cam *n*, which operates upon a roll *n'* journaled upon the cutter *m*. The rotation of the cam shaft operates to raise the cutter *m* at the proper time to sever a section from the strip *l*, and a folder *o* is hinged adjacent to the junction of the cutters and moved, as soon as the section is severed, to press or fold its rear edge around one side of the cigarette end, thus pasting such edge to the cigarette.

As the tipping section lies in contact with one side of the cigarette, the section could not be severed by a straight cutter without interference from the tip, and the cutter *m* is therefore hollowed or concaved upon its cutting end so that it commences to cut the edges of the strip first, and severs the middle portion last, in contact with the under side of the cigarette, the pressure of the cutter serving in its final movement to stick the center strip of paste to the cigarette.

To keep the edges of the cutters *m* and D in working relation, tongues *m'* are shown in Fig. 4 formed upon the outer corners of the cutter *m* and lie constantly in contact with the cutter D, and the strip *l* advances between such tongues before the section is cut off.

The strip guide *k* and upper cutter D are mounted upon a support upon one side of the cutter guide, and the folder *o* is hinged or pivoted upon a support I' upon the opposite side of the cutter guide which supports it directly beneath the cigarette end projecting over the edge of the belt.

The folder is actuated by a cam *p* upon the cam shaft, acting upon a roll upon a lever *q* pivoted to one side of the cutter guide and linked to the folder by a rod *q'*. An ear upon the support I' carries a pivoted finger *r* having a counter weight *r'* to hold it yieldingly in the path of the cigarette tip when the cigarette moves from its station before the cutter D, and such finger exerts a yielding pressure upon the forward edge of the tipping section *v* and presses the same upwardly into the path of an adjacent wiper *s*. A folding apron *t* succeeds the wiper *s* in the path of such portion of the tipping section and completes the folding as the cigarette tip is carried beneath it. The action of the finger, the wiper and the folding apron is illustrated in Fig. 4 where the action of each element upon the tipping section is clearly shown, completing the folding of the section, and wrapping one of its pasted edges over the other.

The wiper *s* and apron *t* are made only a little wider than the tipped portion of the cigarette, as shown in Fig. 3. The folding apron *t* is moved merely by the frictional contact of the cigarette with the same as the cigarette is carried around the driving wheel *c*; the apron inclining toward the surface of the belt *b* to produce the desired pressure upon the tip, and thus lapping the opposite edge against the first folded upon the cigarette, and forming a pasted lapping joint. A guard *u* is supported adjacent to the outer side of the drive wheel *c* to guide the cigarettes into a chute *v* which delivers them to a suitable receptacle.

The cigarette holders upon the belt *b* are provided, as shown in Fig. 2, with a sloping head at the front which sets the cigarettes with the rear end projecting uniformly upon the opposite edge of the belt, to receive the tipping material. The dogs *w* are at the front edge of the belt, and the studs *x* are formed upon a disk *y* secured adjustably by slot and bolt *x'* upon one end of the drum, so that the disk can be adjusted to regulate the operation of the dogs, and deliver the cigarettes exactly into the holders *d*.

It will be noted that as the cork strip is fed from the reel or bobbin it is propelled in a direction longitudinally of the direction of the cigarettes as they lie in the position they assume while receiving the tip and in the construction herein shown this is at right angles to the cigarette carrying belt. The feeding in this direction of tipping material of uniform width produces the desirable results heretofore mentioned. I prefer to sever the tipping material after it has been positioned under the cigarette and flush with the end thereof, as this improves the accuracy of the machine.

The apparatus is wholly automatic in its operation after the cigarettes are supplied to the hopper *g* and the strip of tipping material is placed upon the reel B; so that the tipping material is supplied with paste, divided into sections and wrapped upon the cigarettes without any injury or defacement of the cigarette or tipping material.

Having described my invention what I claim is;

1. In a cigarette tipping machine the combination of means for presenting cigarettes successively to a position for receiving a tip, and means adapted to feed a piece of tipping material from a strip to a position to be applied to the cigarettes, said feeding being in a direction longitudinally of the strip of tipping material and of the cigarette in its presented position, means for severing a piece of the tipping material and means for applying the severed piece about the end of the cigarette.

2. In a cigarette tipping machine the combination of means for presenting cigarettes successively to a position for receiving a tip and means adapted to feed a piece of tipping material from a strip, to the end of the cigarette as presented, said feeding being in a direction longitudinally of the strip of tipping material and of the cigarette as it is presented and means for severing a piece of the tipping material and means for applying the severed piece about the end of the cigarette.

3. In a cigarette tipping machine the combination of means for presenting cigarettes successively to a position for receiving a tip, means adapted to feed the end of a strip of tipping material intermittently under the ends of the cigarettes as they are presented, said feeding being in a direction longitudinally of the strip of tipping material and of the cigarettes as they are presented, means for severing a piece of the tipping material from said strip after it has been fed below the cigarette end and means for applying the severed piece of tipping material about the cigarette end.

4. In a cigarette tipping machine the combination of means for presenting cigarettes successively to a position for receiving a tip and retaining the cigarettes thereat, means adapted to feed the end of a strip of tipping material of sufficient width to encircle the cigarette, under the end of the cigarettes as they are presented, said feeding being in a direction longitudinally of the strip of tipping material and of the cigarettes as they are stationarily retained in their tip receiving position, means for severing a piece from said strip of tipping material and means for applying the severed piece about the cigarette.

5. In a cigarette tipping machine, the combination, with a carrier having cigarettes supplied thereto with the end to be tipped projecting beyond the edge of the carrier sufficiently to receive a pasted tip, of means for moving the carrier with the cigarette ends projecting, to a station for applying the tip, the carrier remaining stationary during the tipping operation, means for feeding the end of a pasted strip of tipping material under the projecting of the cigarette in a direction longitudinally of the direction of the cigarette as positioned, an upper cutter transverse to the end of the cigarette, a lower cutter movable toward the under side of the cigarette and operating with the upper cutter to sever a section of the tipping material flush with the end of the cigarette, and means for folding the severed section about such projecting end.

6. In a cigarette tipping machine, the combination, with a belt having cigarette holders, of means for supplying cigarettes to the belt with the end to be tipped projecting, means for feeding the end of a pasted strip of tipping material beneath such projecting end, a folder operating to wrap the tipping section around one side of the cigarette, a yielding finger to bend the section around the opposite side of the cigarette when carried past the same by the belt, and a presser to complete the folding of the section around such opposite side of the cigarette.

7. In a cigarette tipping machine, the combination, with a belt having holders to receive the cigarettes with an end projecting at the edge of the belt, of a cigarette hopper over one end of the belt and a grooved drum arranged between the hopper and the belt and turned intermittently to carry the cigarettes from the hopper to the belt.

8. In a cigarette tipping machine, the combination, with a belt having holders to receive the cigarettes, with the end projecting at the edge of the belt, of a cigarette hopper over one end of the belt, a grooved drum arranged between the hopper and the belt with a casing upon one side to retain the cigarettes in the grooves and means actuated by the belt for rotating the drum intermittently to discharge the cigarettes into the holders.

9. In a cigarette tipping machine, the combination with a belt having holders to receive the cigarettes with the end projecting at the edge of the belt, of a cigarette hopper over one end of the belt, a grooved drum arranged between the hopper and the belt with a casing upon one side to retain cigarettes in the grooves, studs upon the drum intermediate of the grooves and dogs upon the belt adjacent to the holders to actuate the drum intermittently to discharge the cigarettes successively into the holders.

10. In a cigarette tipping machine, the combination with a belt having cigarette holders and means for supplying cigarettes to the belt with the end to be tipped projecting of means for shifting the belt to bring each cigarette to the cutter to receive a tipping section, means for feeding the end of a strip of tipping material beneath the cigarette end, an upper cutter held at the end of the cigarette; a movable cutter with concave end operating to cut the tipping section from the strip, and means for wrapping the pasted section about the cigarette.

11. In a cigarette tipping machine, the combination, with a belt having cigarette holders and means for supplying cigarettes to the belt with the end to be tipped projecting, of means for shifting the belt to bring each cigarette holder to a cutter to receive a tipping section, means for feeding the end of a strip of tipping material beneath the cigarette end, an upper cutter held at the end of the cigarette end, a movable cutter with concave end operating to cut the tipping section from the strip, a folder operating to wrap the section around one side of the cigarette, and stationary devices operated when the belt is in operation for wrapping the tipping section around the remainder of the cigarette.

12. In a cigarette tipping machine, the combination, with a belt having cigarette holders and means for supplying cigarettes to the belt with the end to be tipped projecting, of means for shifting the belt to bring each cigarette holder to a cutter and holding it thereat to receive a tipping section, means for feeding the end of a strip of tipping material beneath the cigarette end, a vertical cutter guide mounted below the cigarette end with a cutter movable vertically therein, a support upon one side of the knife guide with a stationary cutter held at the end of the cigarette, and a support upon the opposite side of the knife guide with a folder jointed thereto and means for oscillating the folder while the cigarette is held stationary.

13. In a cigarette tipping machine, the combination, with a belt having the transverse holders *d* for the cigarettes with the end projecting beyond the belt, of the driving wheel *c* for the belt, the gear wheel *h* for turning the same, the cam shaft *i* having a mutilated gear for intermittently turning the gear wheel and shifting the belt means for feeding the end of a pasted strip of tipping material beneath the cigarette, a cutter, a cam on the cam shaft for actuating the same to sever a tipping section from the strip, a folder, and a cam upon the cam shaft to actuate the same to fold the severed section around one side of the cigarette.

14. In a cigarette tipping machine, the combination, with a bolt having holders to carry the cigarettes with the end projecting over the edge of the belt, of means for supplying a pasted section of tipping material to one end of the cigarette, a folder for folding such pasted section over one side of the cigarette, a yielding finger held in the path of the tip to bend the section against the other side of the cigarette and rollers with an apron held adjacent to the path of the tip to fold the remainder of the section down upon the cigarette.

15. In a cigarette tipping machine, the combination, with a belt having cigarette holders to receive the cigarettes with the end projecting at the edge of the belt and means for shifting the belt to bring the cigarettes successively to a tipping device, of a cutter adjacent to the end of the cigarette when shifted, a strip guide adjacent to the cutter, means for feeding a strip of pasted tipping material through the guide at one side of the cigarette, means for cutting a section of material from such strip and means for wrapping it upon the cigarette.

16. In a cigarette tipping machine, the combination, with a belt having cigarette holders to receive the cigarettes with the tip projecting at the edge of the belt, a feed wheel for shifting the belt to bring the cigarettes successively to a tipping device, a cutter adjacent to the end of the cigarette when shifted, a ribbon guide adjacent to the cutter, a feed roll and a paste roll adjacent to the strip guide, a cam shaft with connections for driving the belt wheels intermittently, and a cam on the cam shaft with connections to the paste roll for intermittently turning the same to feed the ribbon through the ribbon guide.

Signed at Hingham, in the county of Plymouth and State of Massachusetts, this 3 day of February 1910.

ALEXANDER BOUCHER.

Witnesses:

A. H. Bussmann,

Martin Baker.